Nov. 17, 1953          H. J. RAND          2,659,566

INTEGRAL VALVE AND STEM WITH REINFORCING FLANGE

Filed Jan. 15, 1949

INVENTOR.
HENRY J. RAND
BY
Hyde, Meyers, Baldwin & Doran
ATTORNEYS

Patented Nov. 17, 1953

2,659,566

UNITED STATES PATENT OFFICE 2,659,566

INTEGRAL VALVE AND STEM WITH REINFORCING FLANGE

Henry J. Rand, Bratenahl, Ohio, assignor to Magic Seal, Inc., Bratenahl, Ohio, a corporation of Ohio Application January 15, 1949, Serial No. 71,094

1 Claim. (Cl. 251—27)

This invention relates to improvements in means for mounting a resilient valve plug on a valve stem in a novel type of valve which is adapted to be opened and closed by a feather touch.

The present invention is directed to a type of valve wherein a valve housing is provided with a fluid inlet and a fluid outlet and a generally cylindrical bore between the inlet and outlet. A resilient plug type seal is adapted to be passed down through the bore from the downstream side thereof to a position on the upstream side thereof and thereafter the plug moves into the upstream end of the bore to seal the same with a line contact. In such a type of valve, it is the object of the present invention to provide novel means for mounting the resilient plug on the valve stem for the purposes of providing a strong construction, providing a mounting of the valve plug or washer on the stem in such a fashion that it can never become loose, providing means for rendering that portion of the plug which closes the bore sufficiently rigid that it will not sing or chatter, and providing a very cheap construction for a valve of this type.

Other objects and advantages of the present invention will be apparent from the drawings and the specification, and the essential features thereof will be set forth in the appended claim.

In the drawings,

Fig. 5 is an enlarged sectional view taken along the line 5—5 of Fig. 1, while

I have chosen to illustrate my invention as applied to a type of valve which in general is more fully described in my copending application Serial No. 71,092, filed January 15, 1949, to which reference may be had for more complete description of the advantages and operation of the valve itself. The present application is directed toward an improvement in the construction of the mounting of the valve plug on the valve stem.

Figure 1:
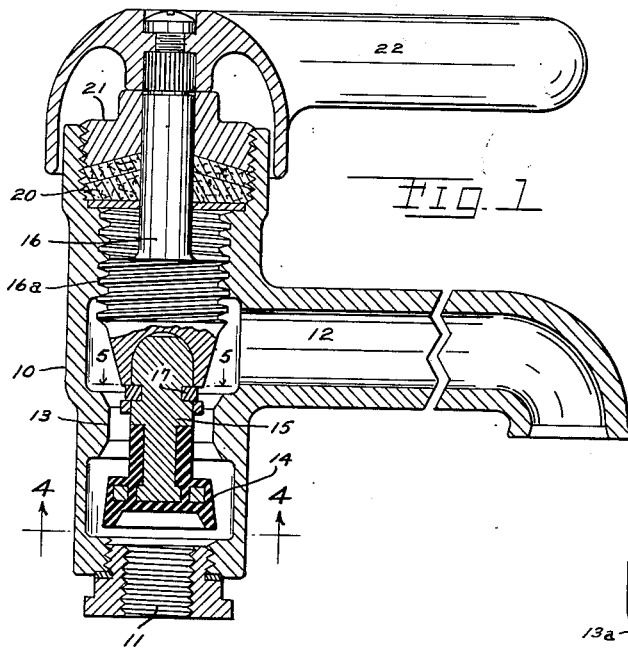
Fig. 1 is a central sectional view through a valve of the faucet type embodying the present invention.
Figure 5:
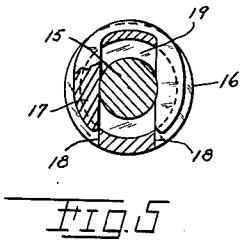

Referring to Fig. 1, a valve housing 10 is provided with a fluid inlet 11 and a fluid outlet 12. A generally cylindrical bore 13 is provided between the inlet and outlet. A resilient valve plug 14 is mounted on valve stem portion 15 which in turn is mounted for rotation relative to a stem portion 16 by the construction shown in Fig. 5. This comprises a U-shape member 17 which slidingly engages milled slots 18 in the stem portion 16 and engages in an annular groove 19 in the upper end of stem portion 15. The stem portion 16 is provided with threads 16a which engage in coacting threads in the valve housing so as to operate the stem up and down. The upper end of the housing is closed by a packing gland 20 which is held in place by a packing nut 21. To the upper end of stem portion 16 is secured a handle 22 for manipulation of the valve.

Figure 6:
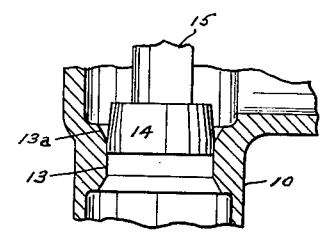
Fig. 6 is a fragmental sectional view similar to Fig. 1 and showing the position of the valve plug as it is being inserted for movement downwardly through the bore to its operative position.
Figure 3:
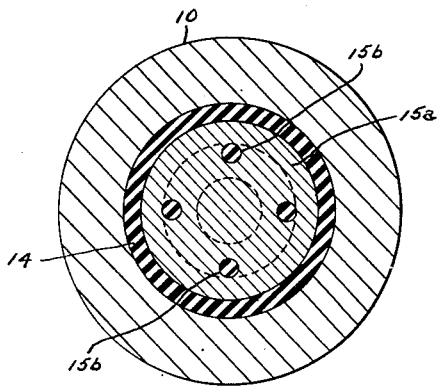
Fig. 3 is a sectional view taken along the line 3—3 of Fig. 2.
Figure 4:
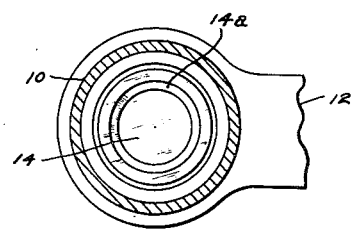
Fig. 4 is a sectional view enlarged taken along the line 4—4 of Fig. 1, and showing a bottom plan view of the valve plug itself.

Referring to Fig. 6, the plug 14 is of sufficient resilience and of such a diameter that it may be compressed radially inwardly for the purpose of inserting the valve plug from the top of the valve housing and pushing the same downwardly to the operative position shown in Fig. 1. In Fig. 6, the valve plug is being pushed downwardly through the bore 13 and is aided in this action by the flared upper end of the bore indicated at 13a.

Figure 2:
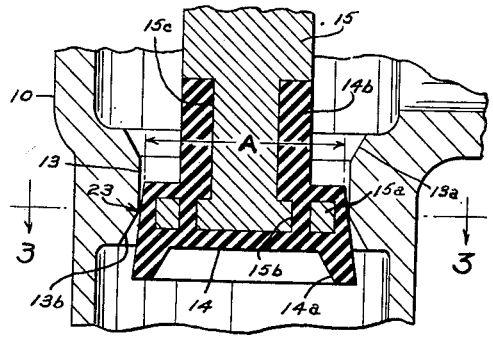
Fig. 2 is an enlarged fragmental sectional view of certain of the parts of Fig. 1.

Preferably, but not necessarily, the valve plug has a cup shape bottom opening downwardly as shown in Figs. 1 and 2. The main body of the plug therefore has the downwardly extending peripheral flange 14a which is adapted to be cammed inwardly when the plug is inserted from the top downwardly in the position shown in Fig. 6. In the form of my valve illustrated, the side walls of the plug are flared outwardly and downwardly at an angle of five to ten degrees to the vertical as clearly shown in Figs. 1 and 2. This construction produces a line contact at the shoulder 23 where the flare 13b joins the generally cylindrical portion of the bore 13.

The present invention relates to the bonding of the resilient plug 14 integrally to the stem portion 15. To this end, the lower end of the stem portion 15 is provided with a flange extending radially outwardly as indicated at 15a. This flange 15a is circular and slightly less in diameter than the diameter A across the top of the plug 14. For instance, in a valve plug of approximately one-half to three-fourths inches in diameter at the dimension A, the diameter of the flange 15a would be within approximately one-sixteenth to one-eighth of an inch less than the plug diameter. This is important in a valve of this type because it thus supports the valve plug rather rigidly opposite the zone 23 where the line contact is made between the plug and the bore. In this way, the plug is prevented from singing or chattering as the valve is opened and closed.

Preferably, for purposes of bonding the resilient rubber-like material 14 solidly to the flange 15a, the flange is provided with certain number of through openings 15b and the rubber-like material flows integrally through these openings so as to tightly bond the plug to the valve stem.

Preferably, the valve plug is further bonded to the valve stem portion 15 by providing a reduced neck 15c on the stem portion 15 into which the rubber-like material is molded integrally with the bottom portion of the plug 14. Thus, the material 14b snugly embraces the neck portion 15c for a little distance upwardly from the valve plug proper.

It results from the above construction, that the valve plug or washer 14 is firmly and almost integrally bonded with the valve stem portion 15 so that it cannot work loose and so that the fluid pressure, even if rather high, cannot cause the valve stem portion to punch through the plug or washer portion. This also gives a very silent valve operation because there is no chance of the valve plug setting up any vibration because it is firmly bonded to the valve stem portion over a major part of the active sealing part of the plug itself. In addition to all this, the construction shown is very cheaply made and, especially in smaller valves, there is no great loss if the entire stem portion 15 has to be thrown away whenever the resilient plug 14 becomes worn. Actually, this type of valve has a long life, as two million opening and closing operations of a small valve of this type operation on water have caused practically no wear in the plug 14.

What I claim is:

A valve for cooperation with a substantially cylindrical valve bore of predetermined diameter and comprising a stem, a resilient sealing plug secured to said stem, said plug being of generally frusto-conical form having its base of smaller diameter downstream and of slightly less diameter than said bore and having an upstream base of slightly larger diameter than said bore, the portion of the plug which is of the same diameter as the bore being nearer said base of smaller diameter, the side walls of said plug diverging outwardly upstream from said base of smaller diameter at an angle between five and ten degrees, said stem having an integral flange wholly embedded in said plug nearer said base of smaller diameter, said flange extending over substantially the entire area of said base of smaller diameter, said flange having a diameter less than the diameter of said bore, there being sufficient resilient material of said plug radially outside of said flange to cushion and seal said plug in the upstream end of said bore, and said plug being radially compressible to the diameter of said bore, whereby said plug will pass wholly into said bore, and whereby said plug will pass partially into said bore with an initial line contact between said plug and bore at which time said flange prevents chattering and singing of said plug as it moves into sealing engagement with said bore.

HENRY J. RAND.

References Cited in the file of this patent

UNITED STATES PATENTS

| Number | Name | Date |
|---|---|---|
| 222,727 | Peck | Dec. 16, 1879 |
| 361,400 | Quillfeldt | Apr. 19, 1887 |
| 591,072 | Bourne | Oct. 5, 1897 |
| 1,041,123 | Lord | Oct. 15, 1912 |
| 1,668,455 | Horn | May 1, 1928 |
| 1,779,750 | Oldham | Oct. 28, 1930 |
| 1,923,306 | Hagen | Aug. 22, 1933 |
| 1,971,186 | Kornas | Aug. 21, 1934 |
| 2,106,671 | Watson | Jan. 25, 1938 |
| 2,148,850 | Deakins | Feb. 28, 1939 |
| 2,368,887 | Schuer | Feb. 6, 1945 |
| 2,473,591 | Killner | June 21, 1949 |